US005703655A

United States Patent [19]
Corey et al.

[11] Patent Number: 5,703,655
[45] Date of Patent: Dec. 30, 1997

[54] VIDEO PROGRAMMING RETRIEVAL USING EXTRACTED CLOSED CAPTION DATA WHICH HAS BEEN PARTITIONED AND STORED TO FACILITATE A SEARCH AND RETRIEVAL PROCESS

[75] Inventors: Douglas Arthur Corey; Thomas K. Landauer; Bud C. Wonsiewicz, all of Boulder, Colo.

[73] Assignee: U S West Technologies, Inc., Boulder, Colo.

[21] Appl. No.: 665,995

[22] Filed: Jun. 19, 1996

Related U.S. Application Data

[63] Continuation of Ser. No. 410,266, Mar. 24, 1995.
[51] Int. Cl.$^6$ .............. H04N 7/08; H04N 7/087; H04N 7/10; H04N 9/64
[52] U.S. Cl. .............. 348/468; 348/10; 348/478; 348/715; 348/718
[58] Field of Search .............. 348/460, 461, 348/468, 478, 476, 473, 482–485, 906, 7, 10, 13, 14, 714, 716, 715, 718; 358/310, 311, 335; 360/14.1; 395/155; H04N 7/08, 7/87, 7/10, 9/84

[56] References Cited

U.S. PATENT DOCUMENTS

| | | | |
|---|---|---|---|
| 5,343,239 | 8/1994 | Lappington et al. | 348/12 |
| 5,343,251 | 8/1994 | Nafeh | 348/571 |
| 5,375,160 | 12/1994 | Guidon et al. | 348/468 |
| 5,410,359 | 4/1995 | Odijk et al. | 348/468 |
| 5,481,296 | 1/1996 | Cragun et al. | 348/13 |

OTHER PUBLICATIONS

Dumais, et al., "Using Latent Semantic Analysis to Improve Access To Textual Information", [From CHI'88 Proceedings], pp. 1–5.

Deerwester, et al., "Indexing by Latent Semantic Analysis", Journal of the American Society for Information Science, pp. 1–16.

Landauer et al, "Fully Automatic Cross–Language Document Retrieval", Bell Communications Research, Morristown NJ, pp. 1–13.

*Primary Examiner*—John K. Peng
*Assistant Examiner*—John W. Miller
*Attorney, Agent, or Firm*—Sheridan, Ross

[57] ABSTRACT

The present invention is a system and method for retrieving segments of stored video programs using closed caption text data. The closed caption text data is extracted from video programming signals received by the invention. Text records based on the extracted closed caption data are generated. Each text record is derived from the closed caption data for a single continuous video segment to which the text record serves as an index or key in retrieving this video segment. Preferably, each text record (a) has sufficient content to adequately describe the content of the video segment to which it serves as an index; and (b) corresponds to a video segment focused on a small number of topics. To accomplish (a) and (b) the present invention generates each text record so that it has a predetermined maximum length and so that it is derived from the closed caption data for a single uninterrupted speaker. During video data retrieval, video requests or queries input by users are evaluated either by comparing query terms with terms in the text records, or by comparing an interpretation of query terms with an interpretation of terms in the text records. Subsequently, video segment location information associated with each text record satisfying a query is used to retrieve the video segment to which the text record is an index.

30 Claims, 14 Drawing Sheets

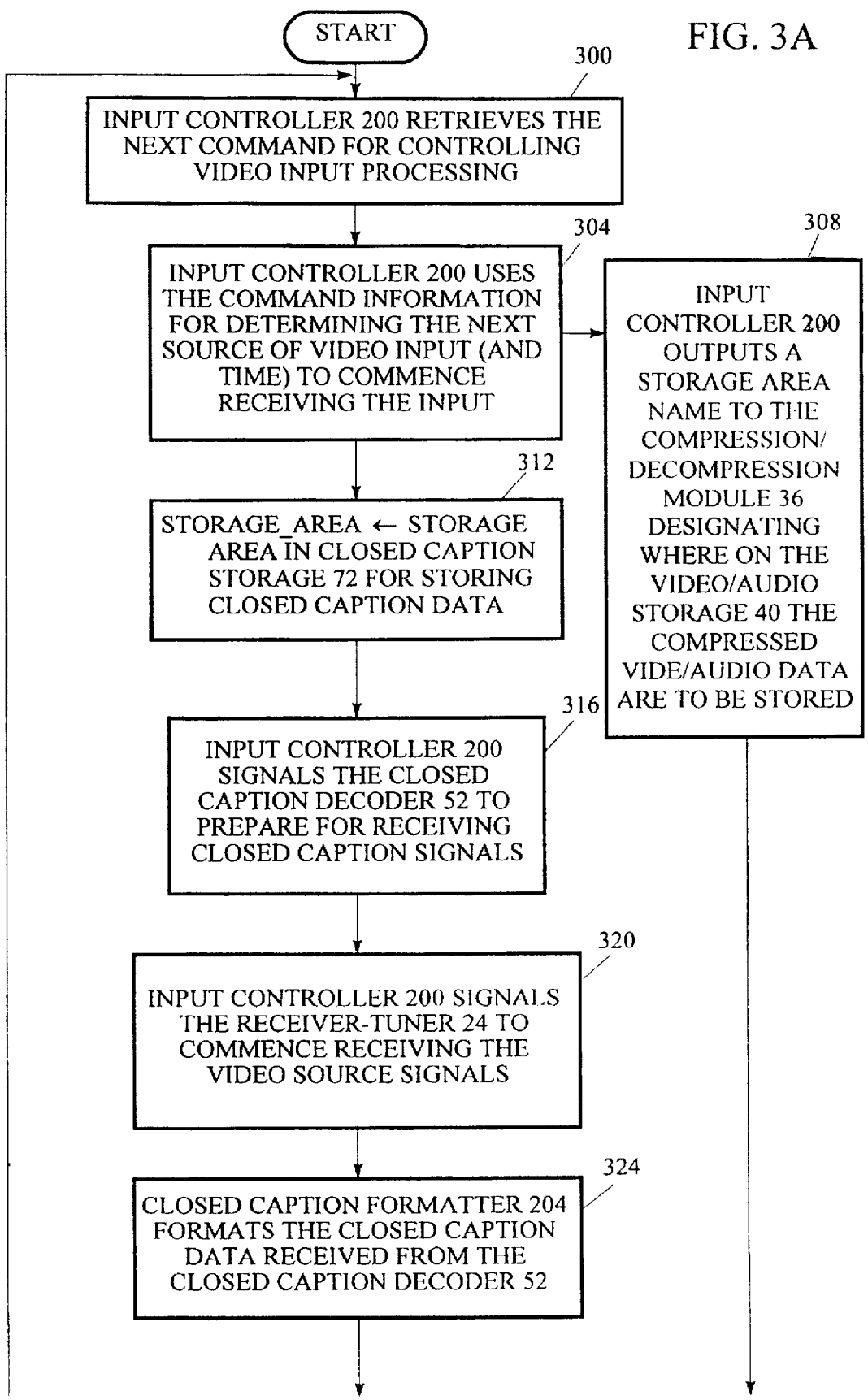

600 604 616          612              608
 \   \  ⌢      ⌢          ⌢
  9 60 '9n9-2.cc Ch 9 news, 5-6 PM 9-2-94 i:9n9-2.mpg

FIG. 6

700                                    704
       ⌢                                      ⌢
Ch 9 news, 5-6 PM 9-2-94                i:9n9-2.mpg
1 : ON THIS
2 : TEAM
7 : I THINK WE CAN BE GOOD
9 : >> WHAT GOT THE DEAL DONE AT THE
9 : END?
10 : >> MONEY,
12 : THAT WAS PART OF IT. A BIGGER
14 : PART WAS I FELT LIKE THEY WANTED
15 : ME TO BE HERE.
17 : I DIDN'T WANT TO BE HERE IF THE
19 : BRONCOS DIDN'T WANT ME TO BE A
19 : PART OF THIS.
22 : I FELT LIKE THINGS HAD CHANGED
24 : AND THE TEAM FELT LIKE THEY
25 : NEEDED ME.
26 : SO I THINK THAT WAS MORE IT THAN
27 : MONEY.

FIG. 7

```
10 | >> MR. SMITH:
11 | I TOLD HIM . . .
```

FIG. 8

```
10 | MR. SMITH:
11 | I TOLD HIM . . .
```

FIG. 9

| | |
|---|---|
| 178 | SHARE YOUR PAIN |
| 179 | WITH ME. |
| 180 | |
| 181 | AND GAIN STRENGTH |
| 181 | FROM THE SHARING. |
| 202 | |
| 203 | WHERE DID YOU |
| 203 | GET THIS POWER? |
| 209 | |
| 209 | THE POWER |
| 210 | WAS WITHIN YOU. |
| 215 | |
| 215 | I FEEL . . . |
| 215 | |
| 216 | AS IF A WEIGHT |
| 216 | HAS BEEN LIFTED |
| 216 | FROM MY HEART. |

FIG. 10

| | |
|---|---|
| 1174 | I FEES SO LIGHT |
| 1174 | |
| 1175 | I COULD FLOAT AWAY. |
| 1175 | |
| 1176 | IS IT STEPHAN? |
| 1176 | |
| 1176 | OR I CAN'T BELIEVE |
| 1177 | IT'S NOT BUTTER! LIGHT! |
| 1178 | |
| 1179 | WITH 1/3 FEWER CALORIES |
| 1179 | THAN BUTTER. |
| 1180 | |
| 1181 | NO CHOLESTEROL |
| 1181 | |
| 1182 | AND GREAT TASTE. |
| 1182 | |
| 1183 | IT MUST BE I CAN'T BELIEVE |
| 1183 | IT'S NOT BUTTER! LIGHT! |

```
^docnumber    22
^NA Ch 9 news, 5-6 PM 9-2-94
^OS    4752
^CS       39
^SF  ccIndexData
^CF 9n9-2.cc
^VF i:9n9-2.mpg
^TI 1
^TE ON THIS TEAM. I THINK WE CAN BE GOOD.
^DU    8

^docnumber    23
^NA  Ch  9 news. 5-6 PM 9-2-94
^OS    4941
^CS       92
^SF  ccIndexData
^CF 9n9-2.cc
^VF i:9n9-2.mpg
^TI 9
^TE WHAT GOT THE DEAL DONE AT THE END?
^DU    1

^docnumber    24
^NA Ch 9 news, 5-6 PM 9-2-94
^OS    5118
^CS      134
^SF  ccIndexData
^CF 9n9-2.cc
^VF i:9n9-2.mpg
^TI 10
^TE MONEY.
^DU    2
```

```
^docnumber    25
^NA Ch 9 news, 5-6 PM 9-2-94
^OS    5268
^CS       147
^SF ccIndexData
^CF 9n9-2.cc
^VF i:9n9-2.mpg
^TI 12
^TE THAT WAS PART OF IT.  A BIGGER PART WAS I FELT LIKE THEY WANTED ME TO BE HERE.
I DIDN'T WANT TO BE HERE IF THE BRONCOS DIDN'T WANT ME TO BE A PART OF THIS.
I FELT LIKE THINGS HAD CHANGED AND THE TEAM FELT LIKE THEY NEEDED ME.
SO I THINK THAT WAS MORE IT THAN MONEY.
^DU      17
```

FIG. 12B

VIDEO PROGRAMMING RETRIEVAL USING EXTRACTED CLOSED CAPTION DATA WHICH HAS BEEN PARTITIONED AND STORED TO FACILITATE A SEARCH AND RETRIEVAL PROCESS

This is a continuation of co-pending application Ser. No. 08/410,266, filed on Mar. 24, 1995.

FIELD OF THE INVENTION

The present invention relates to the use of closed caption data for retrieving desired video programming segments, and in particular, to using closed caption data to generate video retrieval information for retrieving excerpts from a plurality of closed captioned video programs.

BACKGROUND OF THE INVENTION

With the advent of advanced telecommunication networks, consumer telecommunication services are available that allow a consumer to tailor these services more closely to his/her desires. For example, a consumer may request transmittal of selected video programs such as movies or informational video material to his/her television. Unfortunately, the cataloging or indexing of such video programs is limited and retrieval is substantially only by a title. Thus, it is difficult to supply the consumer with programming related to a particular topic. This is especially true when the desired material is provided by one or more video segments taken from longer video programs wherein each of the longer video programs includes material on a plurality of different topics. For example, in current telecommunication consumer services a consumer may not request all news report segments discussing substantially only the U.S. bond market wherein the segments are taken from selected financial broadcasts televised within the most recent two weeks. In fact, there has heretofore been no feasible system for indexing such video segments since an analysis of the content of video programs would be required and such analysis as not heretofore been sufficiently automated.

Accordingly, it would be advantageous to provide a method and system for providing retrieval by content of video programing, and in particular, retrieval by content of relevant video segments embedded within longer video programs.

SUMMARY OF THE INVENTION

The present invention is a novel video retrieval system and method for indexing and retrieving portions of video programming data contained in a video/audio storage area—the video programming data including audio-visual programs such as those typically broadcast for television. In particular, the present invention utilizes the content of the video programming data itself in accomplishing the indexing and retrieving. More particularly, the present invention provides for the retrieval of one or more video program segments embedded within one or more video programs.

In providing the indexing and retrieving of video programming data by content, it is an aspect of the present invention to utilize the closed caption data that is incorporated into most video programming data. In particular, the present invention uses the closed caption data for decomposing the video programming data into the audio-visual segments (hereinafter denoted video segments) which may be indexed for retrieval. For example, in one preferred embodiment, video programming data is decomposed into video segments wherein each video segment is determined, using the closed caption data, to be for a single speaker which is uninterrupted by any other speaker.

It is a further aspect of the present invention that the closed caption data is used for generating video retrieval information having records for indexing the above mentioned video segments (each video segment also being a continuous portion of a video program, possibly an entire program). That is, the closed caption data is used in creating at least one video index record for each video segment generated, wherein such a video index record may be used for selecting and retrieving its corresponding video segment when appropriate selection criterion is provided. Accordingly, each video index record provides access to an index text record (also denoted "text record") related to, or derived from, the closed caption data of the video segment to which the video index record applies. Moreover, each video index record also provides access to a location for retrieving the corresponding video segment. Thus, by providing one or more queries having a text-based description of video data, each such query is compared to the index text records of the video index records so that the desired video segments may be located and retrieved. That is, each such query may be used for first selecting video index records providing access to index text records satisfying the query and subsequently utilizing references provided by the selected video index record, for locating the video segment (s) having the closed captioned data of the index text record.

It is a further aspect of the present invention to provide each of the above-mentioned queries to a "search engine" having the capability for efficiently selecting the video index records providing access to text records satisfying or matching the query. Thus, the video segment location reference of each selected video index record satisfying the query is then accessed for use in retrieving (or providing access to) the related video segment from the video/audio storage area.

It is a further aspect of the present invention that the search engine include both a context-free query evaluator and a semantic query evaluator for processing input queries. That is, the search engine provides an evaluator for context-free searching, wherein query evaluation is accomplished by identifying words and/or phrases within the closed caption text (of a text record) with word and/or phrases specified in the query.

Alternatively, in the semantic query evaluator, query evaluation is accomplished by matching query terms (e.g. words and/or phrases) with equivalent terms within closed caption text (again, of a text record); i.e. query terms and terms within the closed caption text are matched when deemed synonymous. Thus, the semantic query evaluator examines the context of the terms in both the query and each text record for determining if there is a substantially common context. For example, a query having the term "people work best when working with their hands" may be satisfied by a text record having the closed caption text: "accountants are best suited for knitting".

Additional features and benefits of the present invention will become apparent from the detailed description and the accompanying figures contained hereinafter.

BRIEF DESCRIPTION OF THE DRAWINGS

FIGS. 3A and 3B provide the steps of a flowchart performed in capturing the closed caption data and using it in generating video segmented retrieval data structures;

FIG. 6 is an example of a command used by the control module 60 to direct processing of new video input data;

FIG. 7 is an example of formatted closed caption data output by the closed caption formatter 204;

FIG. 8 illustrates one method of introducing a new speaker in closed caption text;

FIG. 9 illustrates a second method of introducing a new speaker in closed caption text;

FIG. 10 illustrates an alternative format used for closed caption data;

FIG. 11 illustrates another alternative format used for closed caption data;

FIGS. 12A and 12B presents a series of index text records generated from the formatted closed caption data of FIG. 7.

DETAILED DESCRIPTION OF THE PREFERRED EMBODIMENT

Figure 1:
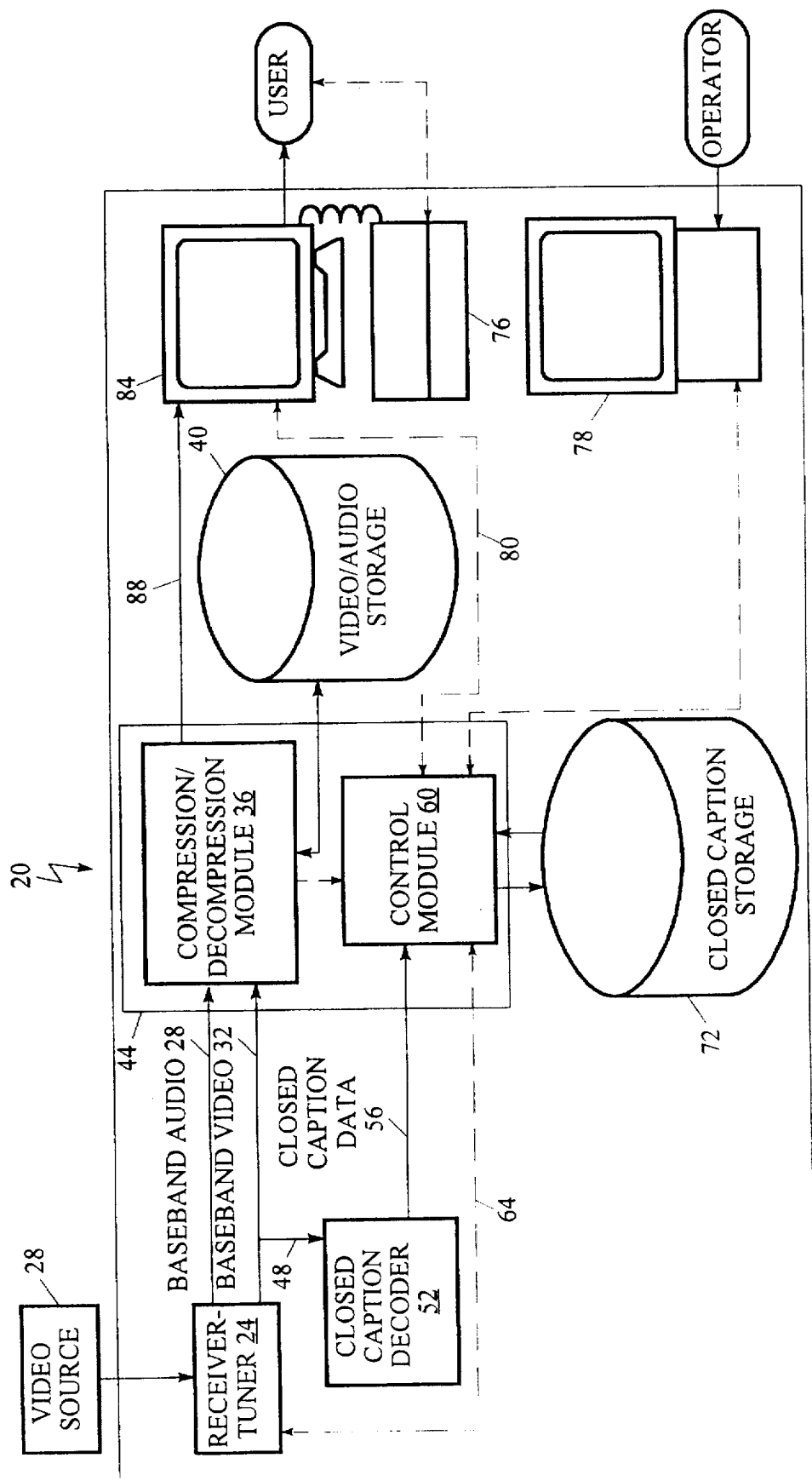
FIG. 1 is a high level block diagram of the hardware and software components of the present invention.

In FIG. 1 a high level diagram of the video retrieval system 20 of the present invention is presented. Regarding this and other diagrams, it is worthwhile to note that solid arrows represent primary data flows between various invention related components and dashed arrows represent primary control paths between various invention related components.

Referring now to the components of the video retrieval system 20 of FIG. 1, a receiver-tuner 24 is provided for receiving signals from a video source 28. Note that the video source 28 may, for example, be a source for either wireless or cable broadcasting of closed caption programming (e.g., news reports and/or movies). The receiver-tuner 24 may be any appropriate component that converts RF television signals into separate baseband audio and video signals. Further, it is preferable that the receiver-tuner 24 have the capacity to be remotely controlled for activating/deactivating and tuning the receiver-tuner 24 to a desired channel. In the present embodiment, a personal computer/video cassette recorder (PC-VCR) by NEC is used as the receiver-tuner 24, thereby also allowing video programming signals to be supplied from video tape as well.

Once the receiver-tuner 24 has converted the video signal into its baseband audio and video signals, these two signals are supplied, via signal channels 28 and 32 respectively, to a compression/decompression module 36 for digitizing and compressing the signals, and subsequently storing the resulting representations on video/audio storage device 40. In one embodiment, the compression/decompression module 36 resides on a hardware platform 44 including a Gateway 2000 486 based personal computer having an MPEG1 encoder board by Optibase for compressing and decompressing the audio and video baseband signals. Further, note that the video/audio storage device 40 is preferably a high capacity random access storage device such as a 20 Gigabyte disk. However, it is within the scope of the present invention that the video/audio storage device 40 may include different storage devices such as a magnetic tape archival system.

The baseband video output by the receiver-tuner 24 is also supplied, via signal channel 48, to a closed caption decoder 52 for decoding the closed caption data from the video signal. Note that in the United States, closed caption data is carried as digital data modulated into line 21 of the video baseband signal. This line is considered part of the vertical blanking interval of the video or TV signal. In the present embodiment, the closed caption decoder 52 is a model DE 152 Data Recovery Decoder III from EEG. This decoder outputs raw closed caption data either with text formatting control codes or with the closed caption data formatted according to the control codes.

The closed caption data output by the closed caption decoder 52 is supplied, via data channel 56, to a control module 60 for controlling, for instance, the process of building and subsequently using video segment retrieval data structures. For example, the control module 60 controls the receiver-tuner 24 by supplying it with control signals, via control channel 64, indicating when to start and stop receiving video signals, and in addition, indicating from where the video signals are to be received (e.g., whether from a particular channel or a VCR tape drive). Further, the control module 60 also provides control signals, via control channel 68, to the compression/decompression module 36 indicating at least the identifier or file name under which the compressed audio and video data should be stored on the video/audio storage device 40. In addition, the control module 60 also creates various index records which the control module subsequently uses for accessing video programming to be retrieved from the video/audio storage device 40 as will be discussed in detail below. Further note that a closed caption storage device 72 for storing the above mentioned index records is also in communication with the control module 60. Moreover, in one preferred embodiment, the control module 60 resides on the same hardware platform 44 as the compression/decompression module 36 and the storage devices 40 and 72 may be combined into a single storage device.

The video retrieval system 20 of the present invention further includes at least one user input device 76 allowing a user to enter, for example, a query relating to one or more desired video segments to be retrieved. Note that, such user input is provided to the control module 60 via the data channel 80. Further, a monitor 84 (e.g. in a preferred embodiment a standard commercial television) is also provided for displaying a query satisfying video segment(s) retrieved, via data channel 88, from the video/audio storage device 40. Note that although some embodiments may allow the input device 76 to be used for communicating system 20 control commands as well as queries to the control module 60, in a preferred embodiment, an operator or technician provides such commands via a separate input device such as control terminal 78. For example, an operator may input commands indicating which video programs are to be captured, via the receiver-tuner 24, and stored for subsequent retrieval of video segments satisfying a query. It is important to note that the embodiment presented in FIG. 1 is a simplified version of the present invention useful for describing the invention. In a preferred embodiment, the video retrieval system 20 may include a plurality of each of receiver-tuner 24, closed caption decoder 52, compression/decompression module 36 and interaction devices such as devices 76, 78 and 84. Thus, for example, a control module 60 may used in controlling one or more receiver-tuners 24, closed caption decoders 52 or compression/decompression modules 36 for simultaneously capturing video programming from a plurality of sources. Furthermore, there may be a plurality of users simultaneously interacting with the control module 60 wherein each user has an input device 76, and a monitor 84 for transferring data over, for instance, cable television lines.

Figure 2:
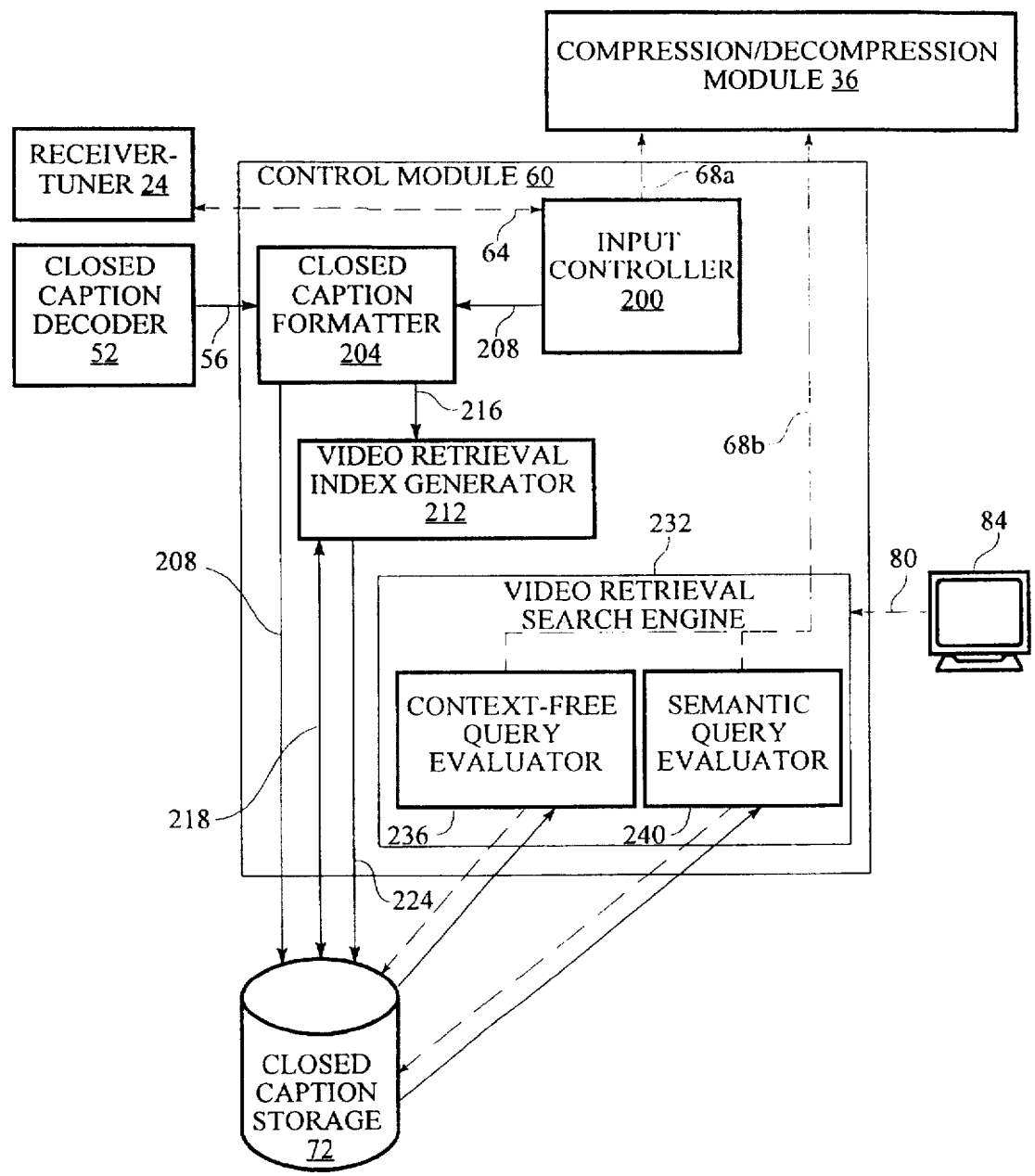
FIG. 2 is a more detailed block diagram presenting the components of the high level control module 60.

Referring now to FIG. 2, a block diagram is presented which provides greater detail as to the internal structure of the control module 60. The control module 60 includes an input controller 200 for reading commands relating to the capturing and processing of newly input video programming data. Note that, an example of such a command is illustrated in FIG. 6 and is discussed below. Further note that the input controller 200 may read commands from one or more batch files of such commands. Accordingly, the input controller 200 supplies instructions or command control information to (a) the receiver-tuner 24 (via channel 64) indicating where (and optionally when) video signals are to be captured; and (b) the compression/decompression module 36 (via data channel 68a, a portion of channel 68 of FIG. 1) indicating the location where newly received and compressed video data should be stored in video/audio storage 40. For example, in FIG. 6, field 600 indicates that the video signal on channel 9 should be retrieved and field 604 indicates that the signal should be captured for sixty minutes beginning immediately. Further, file name information regarding where to store the new video data is provided in field 608, FIG. 6.

Moreover, in one preferred embodiment of the invention, the input controller 200 may issue instructions to a plurality of each receiver-tuner 24, and compression/decompression modules 36 for simultaneously capturing video programming from a plurality of video sources 28.

During the capturing and indexing of new video/programming data, the closed caption decoder 52 provides closed caption data (via data channel 56) to a closed caption formatter 204. The closed caption formatter 204 transforms all closed caption input data into a common closed caption format (an example of this common format is illustrated in FIG. 7) and outputs the formatted closed caption data to at least a video retrieval index generator 212 (discussed below) and optionally to the closed caption storage 72 (via data channel 208). In providing this common format, the closed caption formatter 204 also receives, from the input controller 200, command information describing the new video data to be captured. Note that, the command information supplied is included in a descriptor for the newly input closed caption data. An example of a descriptor obtained using the command of FIG. 6 is provided in FIG. 7 by the line commencing with the descriptor designator symbol "#". Each such descriptor includes: command text 700 (e.g., from field 612, FIG. 6) identifying the video program from which the closed caption data is obtained and a location 704 (also specified initially in the command of FIG. 6; e.g., field 608,) for locating the compressed audio and video data stored on video/audio storage 40. Thus, the descriptor of FIG. 7 designates that the formatted closed caption data following this line is for the Channel 9 news that was broadcast between 5:00–6:00 p.m. on Sep. 2, 1994, and the compressed video data is stored in "i:9n9-2.mpg."

Thus, at a high level the closed caption formatter 204 reads the command input from the input controller 200, constructs the descriptor line for the new closed caption data, outputs the descriptor and subsequently commences to output the formatted closed caption text lines, as for example, illustrated in FIG. 7, wherein each line of formatted closed caption text begins with a number designating the number of seconds from the beginning of the video program to the video segment first displaying the closed caption text of this line. Thus, the closed caption text line, "I think we can be good" in FIG. 7 is first displayed in a video segment beginning seven seconds from the start of the video program to which it belongs. As an aside, note that the vertical line "|" in each line having closed caption text is a separator character provided by the closed caption formatter 204 as part of the common formatting of the closed caption data. This separator character is primarily for ease of (human) understanding.

Also, note that the closed caption formatter 204 may receive command information from the input controller 200 indicating a location for storing the formatted closed caption data on the closed caption storage 72. For example, field 616 of the command of FIG. 6 specifies this location which is provided by the input controller 200 to the closed caption formatter 204. Further, note that the formatted closed caption data is input to the video retrieval index generator 212 (via data channel 216 or alternatively, if the formatted closed caption data is stored first, via data channel 218).

The video retrieval index generator 212 partitions the closed caption text received into "meaningful" groups of text and outputs each such group, hereinafter denoted an "index text record" or simply "text record", to a file in the closed caption storage 72 (via data channel 224). It is intended that each index text record contain enough closed caption text describing the video segment from which the closed caption text was obtained so that there is a high probability that the closed caption text can be used to retrieve the video segment. That is, it is intended that the index text records be used for correlating a text-based query describing video data with user expectations as to the video segment(s) that should be retrieved.

In determining an appropriate method for decomposing closed caption data into index text records, it was found that the uninterrupted dialogue of a single speaker is, in general, one appropriate balance so that there is enough content within a text record to adequately describe the video segment to which the text record corresponds and, in addition, the text record does not correspond to an inappropriately long video segment wherein only a relatively small portion of the video segment is described by a user query. There are, however, certain additional limitations that are imposed upon text records to better achieve the above-mentioned balance as will be discussed below. Further note that there are other ways to achieve the above-mentioned balance. For example, the closed caption text may be decomposed into segments corresponding video segments between one and two minutes in length wherein "logical", easily detectable, breaks such as speaker changes, scene changes, or keyword vocabulary changes are used to delimit each video segment.

Note that an example of a series of index text records for the formatted closed caption text of FIG. 7 is illustrated in FIGS. 12A and 12B.

Referring briefly to FIGS. 12A and 12B, the index text records here are separated from one another by blank lines. Each such record includes a number of fields with each field commencing on a new line. In particular, each field has an identifier tag beginning with "^" designating the field type. In sequence from the topmost field, each index text record includes (examples of fields below refer to the first text record in FIG. 12A):

(1.1) a record number (e.g., "^docnumber 22");

(1.2) the name of the video program to which the record applies (e.g., "^NA Ch 9 news, 5–6 PM Sep. 2, 1994")

(1.3) the byte offset from the beginning of the file (having this record) to the location of the first character of this record (e.g., "4752");

(1.4) the byte offset of the closed caption text for this record in the formatted closed caption data stored on the closed caption storage 72 (e.g., "39");

(1.5) the name of the output file on closed caption storage 72 having this record (e.g., "ccIndexData");

(1.6) the name of the formatted closed caption data file having the text for this record (e.g., "9n9-2.cc");

(1.7) the name of the compressed video/audio file on video/ audio storage 40 containing the video segment having the text of this record (e.g., "i:9n9-2.mpg");

(1.8) the time (in seconds) from the beginning of the video program when the video segment for this record commences (e.g., "1");

(1.9) the closed caption text for this index text record (e.g., "On this team I think we can be good.");

(1.10) the duration (in seconds) of the video segment for the text of this record (e.g., "8").

Note that each index text record of FIGS. 12A and 12B corresponds to the text of a different speaker in FIG. 7, speaker changes in this case being denoted by the string ">>". As an aside, note that there is no standard convention for indicating speaker changes in closed caption text. For example, in FIGS. 8 through 11 illustrate various conventions for indicating new speakers. In particular, FIGS. 8 and 9 illustrate two different methods of annotating for indicating the speaker (typically used in movies), and FIGS. 10 and 11 illustrate positional methods of putting a blank line between text for different speakers or also horizontally spacing the text of two speakers.

Returning again to FIG. 2, note that the video retrieval index generator 212 also outputs (via data channel 224, which may be identical with data channel 218) a series of video index records as described in the discussion above relating to FIG. 1. That is, video index records are generated which are used in satisfying user queries so that expected video segments are retrieved. Accordingly, each video index record provides access to an index text record. Further, note that there may be video index records generated which are specific to various types of query evaluators as is discussed below.

The control module 60 also includes a video retrieval search engine 232 which uses user query input (via data channel 80) and video index records (stored on the closed caption storage 72) for retrieving video segments that a user would likely expect to be matched to an input query. The video retrieval search engine 232 presently includes two submodules for matching query descriptions with video segments: a context-free query evaluator 236 and a semantic query evaluator 240, both of which are discussed below. However, it is important to note that specific query evaluators are not required by the invention; i.e. various types of evaluators and combinations of evaluators are contemplated. As mentioned above, each such evaluator may require distinct indexing record data structures. That is, the video index records may be structured differently for each evaluator and the data structures that organize the video index records may be different for each evaluator.

Regarding the context-free query evaluator 236, this evaluator provides a context-free searching capability for determining video index records satisfying an input query wherein query evaluation is performed by identifying words and/or phrases within closed caption text (of a text record) that are specified in the query. Thus, the context-free query evaluator 236 ignores any context information within a text record not specified in a query. However, note that the context-free query evaluator 236 preferably accepts queries that may include: (a) Boolean operators: AND, OR, and NOT; (b) proximity operators allowing word adjacency specifications as well as field, sentence and paragraph coconcurrents; (c) a field restriction operator; (d) a term truncation operator; and (e) an operator allowing single letter substitution within a term.

Regarding the semantic query evaluator 240, this module allows query terms to be satisfied or matched with semantically equivalent terms from the index text records. Thus, the semantic query evaluator 240 examines the context of the terms in both the query and each text record for determining if there is a substantially common context.

A brief description of one embodiment of the semantic query evaluator follows. However, note that further detail may be obtained from the reference: Deerwester, Scott et al., "Index by Latent Semantic Analysis," Journal of the American Society for Information Science, 41 (6):391–407, 1990, which is herein incorporated by reference.

Briefly, then, the semantic query evaluator 240 is based upon the assumption that there is an underlying latent semantic structure in text data that is partially obscured by the randomness of word choice in query terms. The evaluator uses various statistical techniques to estimate this latent semantic structure and thereby decreases the dependency on word choice in query terms. This idea is embodied using a large matrix of text terms versus text data which may contain the text terms. Once such a matrix is generated, a "semantic" space is constructed wherein text terms and text data are assigned positions in the semantic space. In particular, text data is positioned near terms that are semantically closely associated with the text data. This technique is performed using a method known as singular-value decomposition which allows the arrangement of the semantic space to reflect the major associative patterns in the text terms and the text data containing the terms such that less important associations are ignored. The result of this technique is that query terms that do not actually appear in a portion of the text data may still end up close to the text data if there is consistency between the major patterns of association between the text terms and the text data.

Once an evaluator 236 or 240 has determined one or more video index records whose text records satisfy a query, the video segments corresponding to the text records are retrieved using video location information accessible via the video index records satisfying the query. In particular, note the present embodiment of the invention stores the video location information in each index text record as illustrated in FIGS. 12A and 12B. Subsequently, the evaluator communicates the location information of the video segment corresponding to each index text record satisfying the query to the compression/decompression module 36 (via data channel 68b, part of channel 68 in FIG. 1).

Figure 3B:
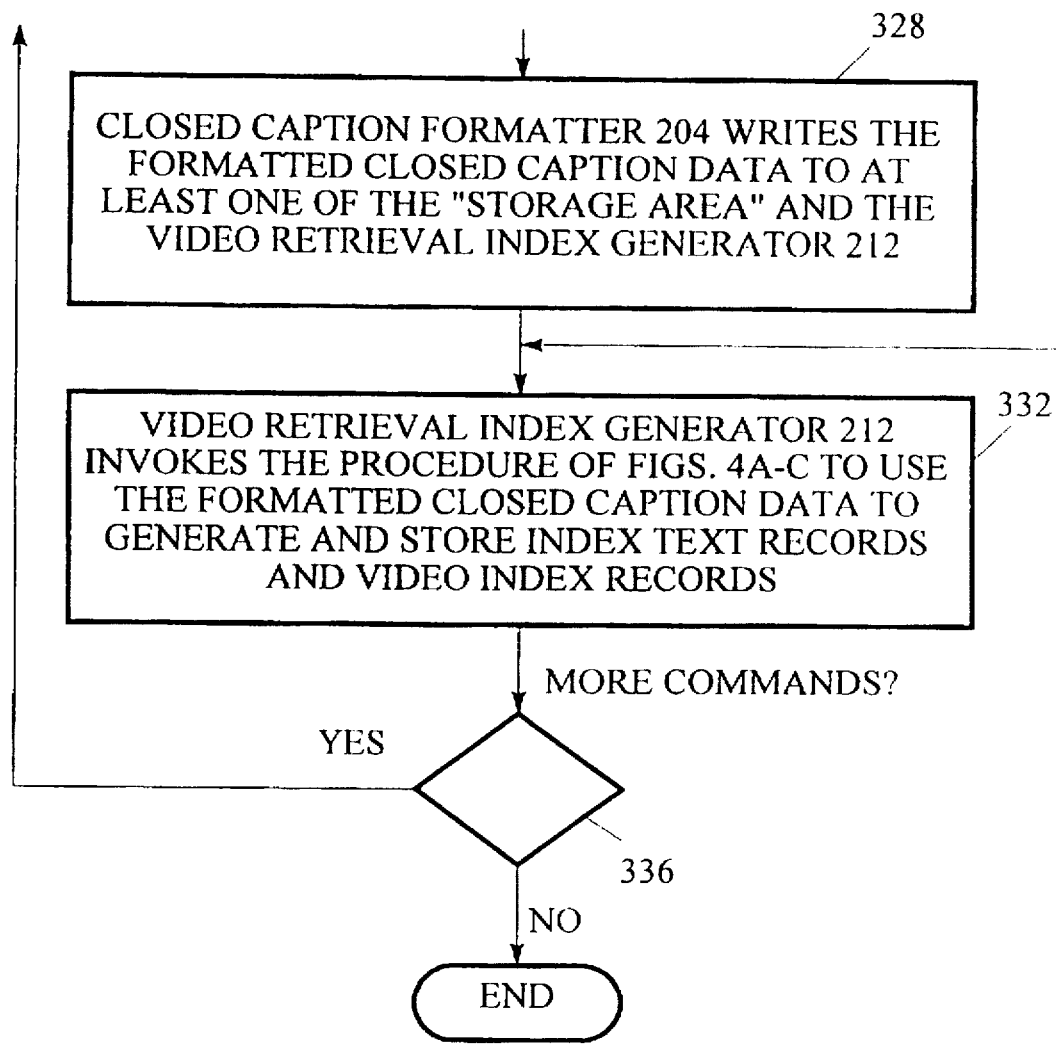

FIGS. 3A and 3B present the high level steps performed by the components of the control module 60. In particular, the flowchart is a loop wherein each pass through the steps of the loop indicates the steps performed for a single command. Given the above description of FIGS. 1 and 2, it is believed that one of ordinary skill in the art can follow FIGS. 3A and 3B without substantial additional description. However, a few remarks are deemed worthwhile. In particular, note that step 308 and the steps 312–328 may be performed in parallel. Further note that in step 332, the video retrieval index generator 212 invokes the procedure of FIGS. 4A, 4B and 4C with two parameters as indicated at the top of FIG. 4A, that is, an input parameter for the formatted closed caption data corresponding to the new video data captured, and a second input parameter having the locations of the storage areas (on the closed caption storage 72) where the index text records and video text records to be generated are to be stored.

Figure 4A:
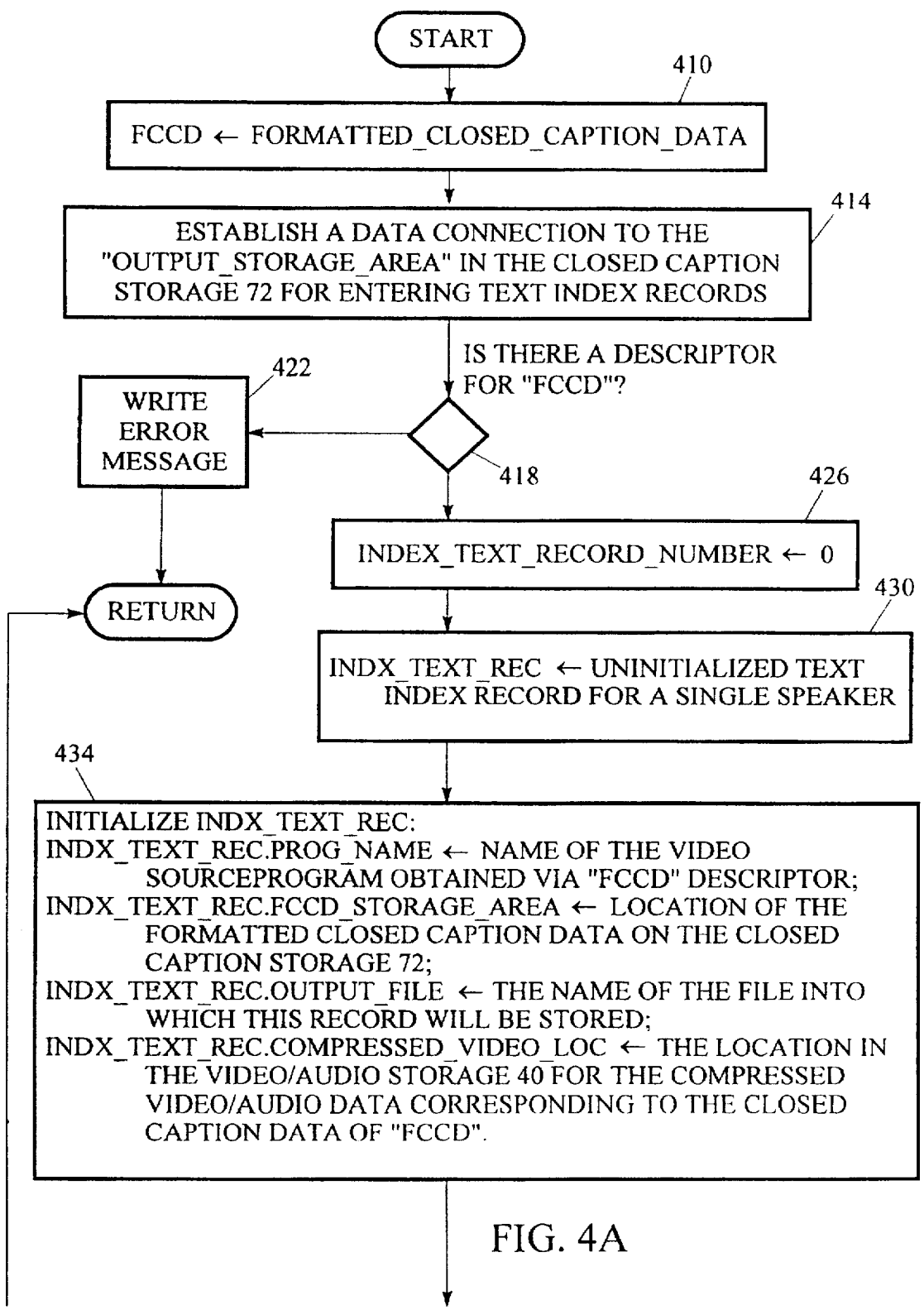
FIGS. 4A, 4B and 4C provide the steps for a more detailed flowchart of the procedure for generating index text records and video index record; note this procedure is invoked by the flowchart of FIGS. 3A and 3B.
Figure 4B:
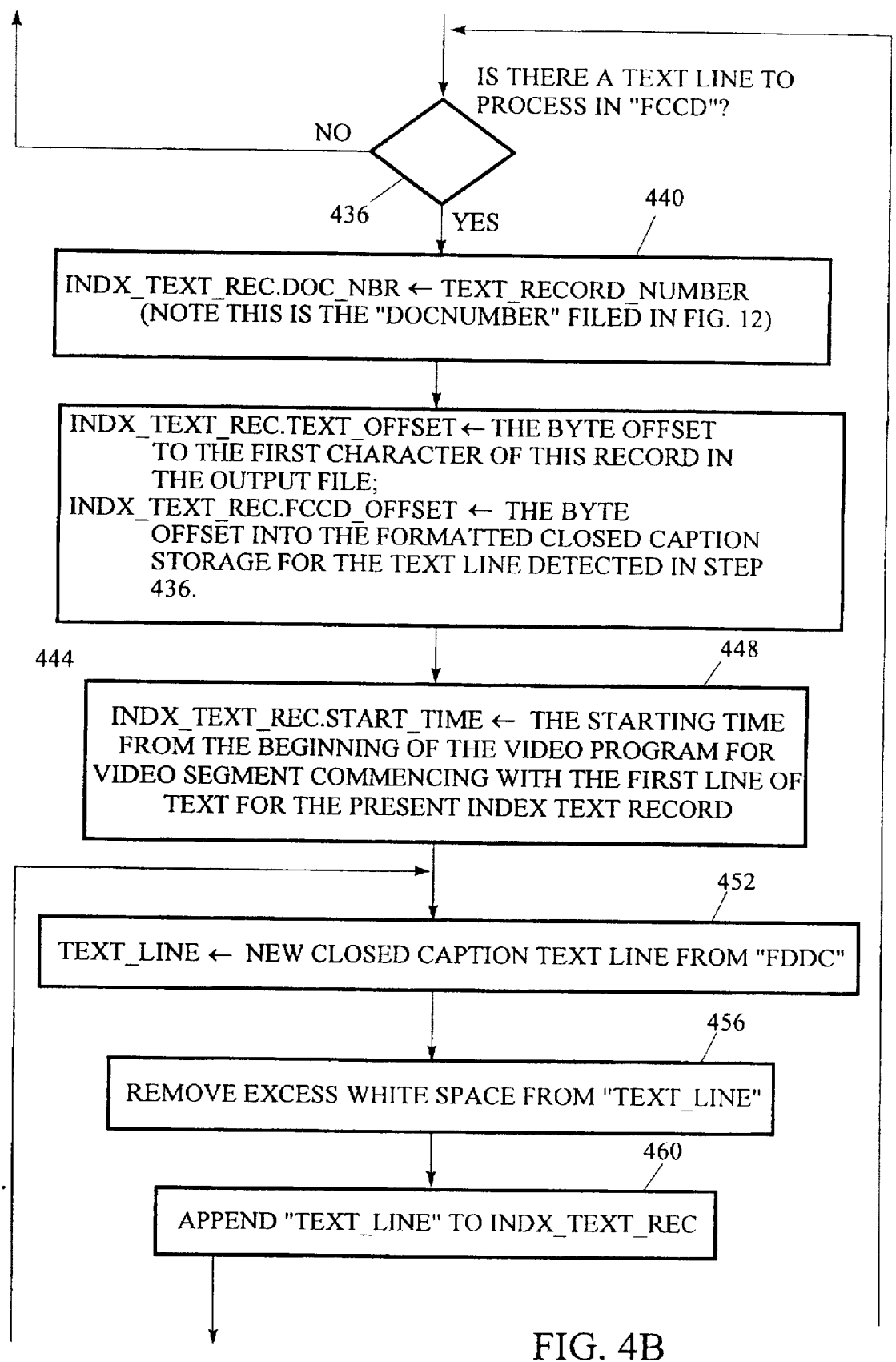
Figure 4C:
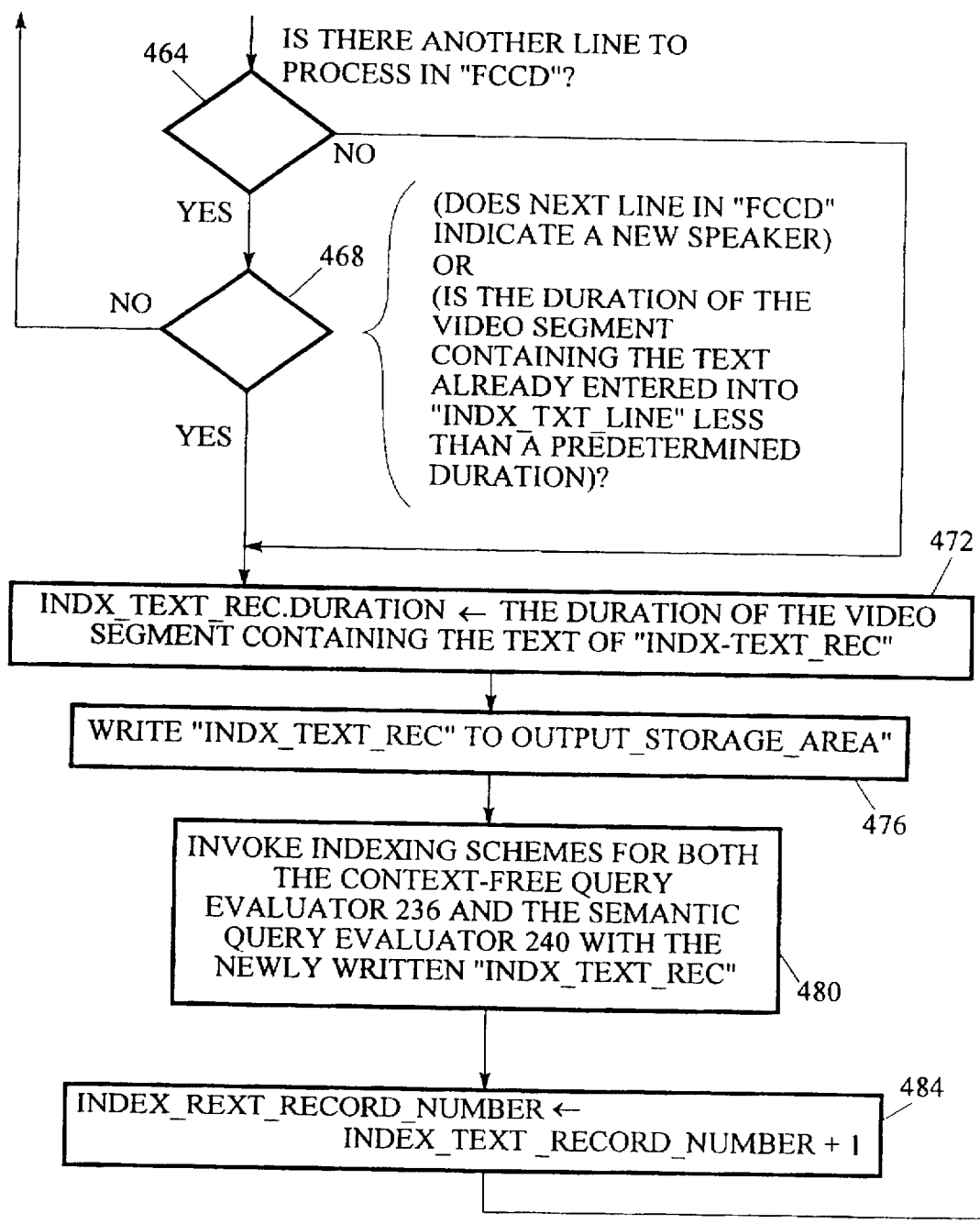

FIGS. 4A, 4B and 4C present the steps performed in generating the video retrieval records (i.e. index text records and video index records). In step 410, the variable "FCCD" is assigned the value of the parameter "FORMATTED_CLOSED_CAPTIONED_DATA". This is done for expediency so that "FCCD" may be used as an abbreviation for the longer identifier "FORMATTED_CLOSED_CAPTIONED_DATA". Steps 414 through 430 are housekeeping and initialization steps in preparation for generating the retrieval records. In step 434, fields having common values for index text records derived from the text referenced by "FORMATTED_CLOSED_CAPTIONED_DATA" are filled in. In particular (referring to the text index records of FIGS. 12), the common index text record fields (1.2), (1.5) through (1.7) discussed above are filled in. In step 436, a determination is made as to whether there is a next text line to process in the input "FORMATTED_CLOSED_CAPTIONED_DATA". In steps 440 through 448, the index text record fields (1.1), (1.3), (1.4) and (1.8) are filled in; i.e. field (1.1) in step 440, field (1.3) and (1.4) in step 444 and field (1.8) in step 448. Subsequently, in the loop having steps 452 through 468, successive closed captioned text lines are entered into the text index record currently being generated. Note that step 468 terminates the loop if a new speaker is detected or the video segment for the index text record is longer than, for example, 5000 characters. Note that this latter criterion facilitates locating requested video segments within long dialogues such as political speeches. Further note that occasionally when a video program is interrupted by a non-closed captioned commercial, the end of line character of the previous closed caption line does not arrive until the commercial terminates minutes later. Therefore, to account for this anomaly, any closed caption text line that has an elapsed time longer than, for example, ten seconds is also used as an indication of a new speaker.

Subsequently, in step 476, the newly generated index text record is written to the "OUTPUT_STORAGE_AREA" of closed captioned storage 72. In step 480, the data structures for the evaluators 236 and 240 are updated including the generation of video index records for the new index text record just created. Finally, in step 484, the record number or "docnumber" (FIGS. 12) is incremented in preparation for any new index text record to be generated.

Figure 5A:
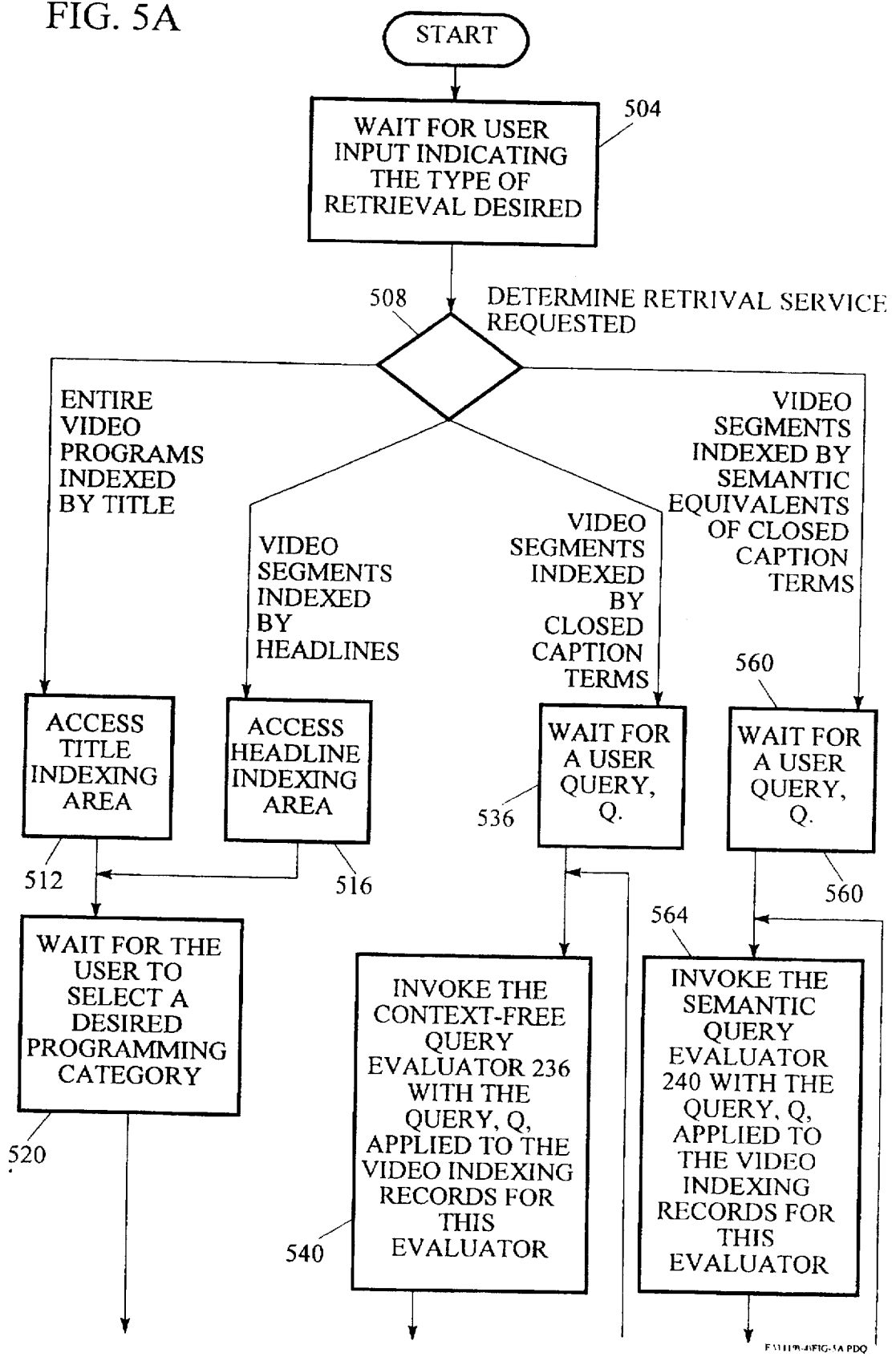
FIGS. 5A and 5B provide the steps of a flowchart performed by the present invention when a user enters one or more queries for retrieval of video programing.
Figure 5B:
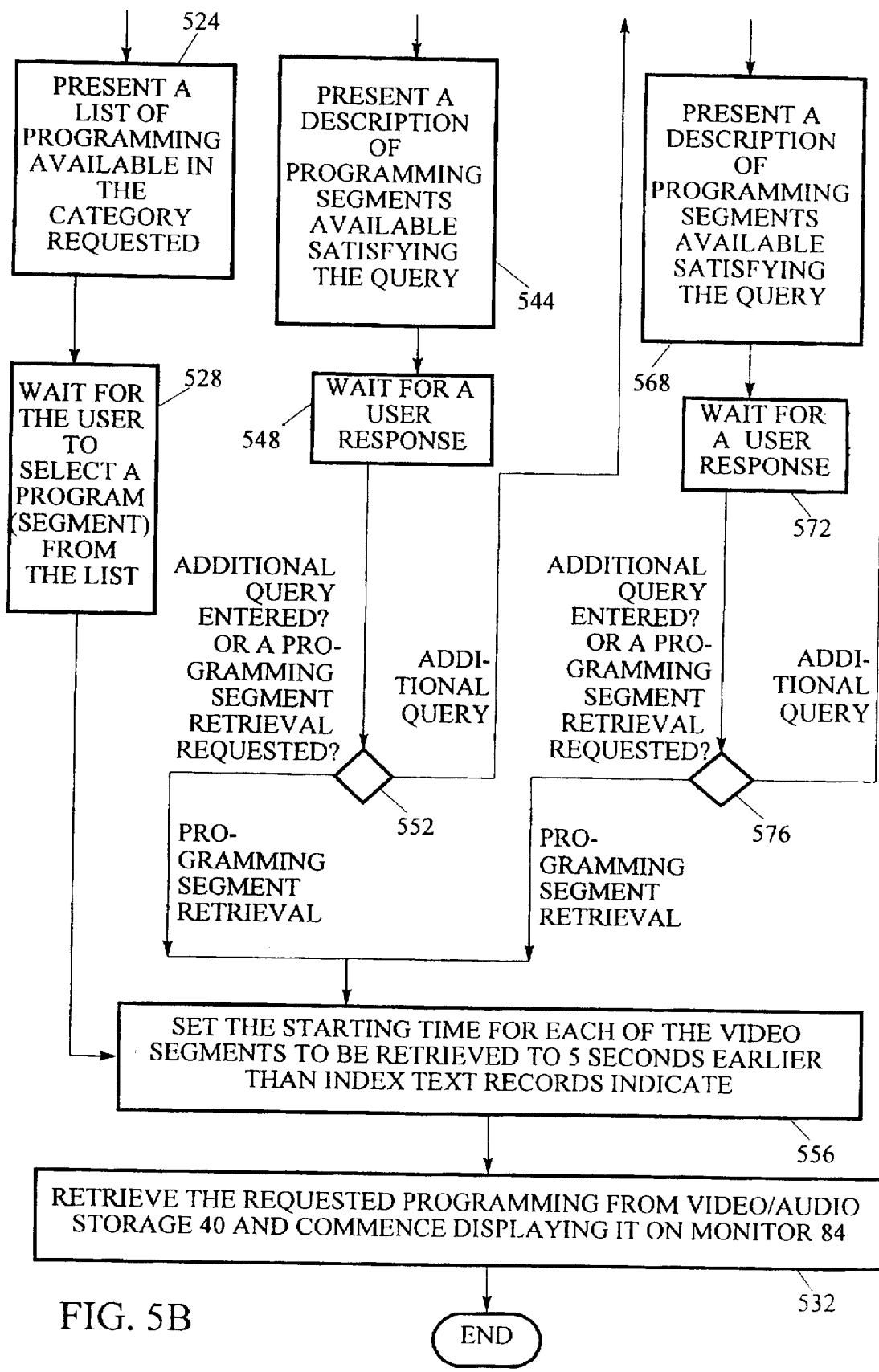

In FIGS. 5A and 5B a high level flow chart is presented of the steps performed by the present invention when a user requests to view video programming on monitor 84. Note that there are four different video retrieval services provided by the present invention. Specifically, each of these four services correspond to one of the four branches exiting from step 508 of FIG. 5A. These services are:

(2.1) A retrieval service which retrieves entire video programs according to title. This retrieval service is represented by the steps 512 through 532;

(2.2) A retrieval service which retrieves video programming segments according to headlines as, for example, would be typical of various portions of video news segments such as a weather headline indicating that snow is likely. This retrieval service is represented by the steps 516 and 520 through 532;

(2.3) A retrieval service based on context-free queries input to the context-free query evaluator 236. This service is represented by the steps 536 through 556, followed by step 532;

(2.4) A retrieval service based on interpreting queries, via the semantic query evaluator 240, such that an attempt is made to match the semantics of each query with the semantics of closed caption text for the stored video segments. This service is represented by the steps 560 through 576, followed by the steps 556 and 532.

Regarding the retrieval services for retrieval by title and headline, note that there is a title indexing area and a headline indexing area which were preferably stored on the closed caption storage 72. The indexing information for each of these two services is partioned into categories such that, in step 520, a category may be chosen prior to choosing a particular requested title or headline. For instance, in one preferred embodiment the titles for video programming are categorized into categories such as movies, sports, entertainment, national news and local news. Thus, in step 520 these categories may be displayed on monitor 84, so that the user may select the desired category via steps 524 and 528 and subsequently have the requested video program retrieved and displayed on the monitor 84 as indicated by step 532.

Note that, the steps performed for the headline retrieval service are substantially the same as for the title retrieval service, the difference being substantially in the information presented to the user. In particular, the following headline categories are examples: weather, local sports, national sports, business and national news. Moreover, once a category is chosen, headlines for the video segments of the chosen category are displayed. Note that, video segments having headline indexing information are typically from recent news broadcasts.

Regarding the retrieval services of (2.3) and (2.4) provided by the context-free query evaluator 236 and the semantic query evaluator 240 respectively, note that each step performed by one of these services corresponds one-for-one with a similar step performed by the other of these two services. Therefore, only the steps 536 through 556 are discussed. Thus, once a user inputs a query in step 536, the query is provided to the context-free query evaluator 236 in step 540. The evaluator 236 uses video indexing records and their corresponding index text records in determining which index text records match or satisfy the query so that, in step 544, a description of the video segment(s) whose index text record(s) satisfies the query may be presented to the user. Note that the title of the video program containing the closed caption text of the query satisfying index text records(s) may be displayed to the user as part of the output description. Subsequently, once a user response is received in step 548, a determination is made in step 552 as to whether the response is for an additional query to be processed or a request to retrieve and view any of the video segments whose descriptions were presented to the user in step 544. If an additional query is to be processed, then steps 540 through 552 are performed again. Otherwise, in step 556, a starting time for the beginning of each requested video segment is determined. It is important to note that in many cases the closed caption data for a video segment is only approximately synchronized with the video segment. That is, the closed caption data may occur after the video segment to which it should be synchronized. Thus, for each video segment identified as containing closed caption data satisfying a query, a predetermined timing offset is used for retrieving a video segment starting earlier thereby assuring that the retrieved video segment includes the audio-visual portion which should be synchronized with the closed caption data satisfying the query. Further note that it has been determined that five seconds is an appropriate time offset. Finally, in step 532 the requested video segments are retrieved from video/audio storage 40 and displayed on the monitor 80.

The foregoing of the discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described here and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for obtaining video data, comprising:
   receiving video signals having corresponding video data and closed caption data, wherein said video data comprises different information than said closed caption data;
   storing said video data as segments;
   partitioning said extracted closed caption data to obtain a plurality of text portions, wherein one or more of said text portions are determined according to a detectable change in content of said video signals;
   storing said plurality of text portions in a means for storing;
   generating video retrieval information data items for retrieving said segments, wherein each of said video retrieval information data items is generated using a related one of said text portions, said related text portion being retrievable from said means for storing using the generated video retrieval information data item, and wherein, for some of said video retrieval information data items, VRI, said video retrieval information data item VRI provides access to a stored associated said segment of the video data corresponding to the related text portion used to generate VRI;
   providing a query for desired video data;
   controlling the selection of a first stored video data segment using said query with at least one of said video retrieval information data items; and
   retrieving said first stored video data segment.

2. A method as claimed in claim 1, wherein at least one of said video retrieval information data items includes an index text record having said related text portion.

3. A method as claimed in claim 1, wherein at least one of said video retrieval information data items includes access to said related text portion and a reference for use in retrieving said associated segment.

4. A method as claimed in claim 3, wherein said step of controlling includes determining a beginning corresponding with a portion of said video signals including said associated segment, wherein said beginning occurring earlier than said associated segment.

5. A method as claimed in claim 3, wherein said step of retrieving includes using said reference, for locating said associated segment, said associated segment corresponding in content to closed caption data for obtaining said related text portion.

6. A method as claimed in claim 1, wherein said step of generating includes determining that each of said video retrieval information data items relates to a portion of said closed caption data for a single speaker.

7. A method as claimed in claim 6, wherein said step of partitioning includes limiting a length or duration of each said text portion.

8. A method as claimed in claim 1, wherein said step of partitioning includes determining an elapsed time for a line of said closed caption data.

9. A method as claimed in claim 1, wherein said step of providing includes inputting said query to a search engine for performing said step of controlling.

10. A method as claimed in claim 1, wherein said step of controlling includes comparing one or more terms of said query with one or more terms in said related text portion for at least one of said video retrieval information data items.

11. A method as claimed in claim 1, wherein said step of controlling includes determining that an interpretation of said related text portion for at least one of said video retrieval information data items includes an interpretation of said query.

12. A method as claimed in claim 1, wherein said step of retrieving includes accessing one or more references from data in at least one of said video retrieval information data items, at least one of said one or more references providing a location of said associated segment.

13. A method as claimed in claim 1, wherein said step of detecting includes determining one of a change in speaker, a scene change, and a keyword vocabulary change in said video signals.

14. A method as claimed in claim 1, wherein said step of providing a query occurs after said steps of partitioning and generating.

15. An apparatus for retrieving video data, comprising:
   receiving means for receiving video signals, said video signals including corresponding video data and closed caption, wherein said video data includes audio and visual data;
   closed caption extraction means for extracting said closed caption data from video signals received by said receiving means;
   means for partitioning said extracted closed caption data to obtain a plurality of text portions, wherein one or more of said text portions are determined according to a detectable change in content of said video signals;
   storage means for storing said video data included within the video signals received by said receiving means and for storing said plurality of text portions;
   means for generating video retrieval information data items for retrieving segments of said video data, wherein: each of said video retrieval information data items is generated using a related one of said text portions, said related text portion being retrievable from said storage means using the generated video retrieval information data item, and wherein, for some of said plurality of video retrieval information data items, VRI, said video retrieval information data item VRI provides access to an associated video segment of the video data stored in said storage means, said associated video segment corresponding with said related text portion of the closed caption data used to generate VRI;
   interaction means for inputting at least one of a request and query for desired video data;
   control means for receiving said at least one of said request and query from said interaction means for use with said video retrieval information data items to direct retrieval of video data from said storage means, satisfying said at least one of said request and query.

16. An apparatus as claimed in claim 15, wherein for each said video retrieval information data item, said related text portion includes an amount of text effective for allowing said control means to determine, for the request or query, whether said associated video segment for said video retrieval information data item should be retrieved.

17. An apparatus as claimed in claim 15, wherein for each said video retrieval information data item, said related text portion is obtained from closed caption data for a single speaker.

18. An apparatus as claimed in claim 15, wherein for each said video retrieval information data item, said related text portion is obtained from closed caption data of a video segment less than a predetermined duration.

19. An apparatus as claimed in claim 15, wherein for each said video retrieval information data item, said related text portion is obtained from closed caption data of the video segment to which the video retrieval data item is associated.

20. An apparatus as claimed in claim 15, wherein for each said video retrieval information data item, said related text portion includes closed caption data of the video segment to which the video retrieval data item is associated.

21. An apparatus as claimed in claim 15, wherein each said VRI includes location information indicating the location of said associated video segment.

22. An apparatus as claimed in claim 21, wherein said location information includes timing information for locating said associated video segment according to an elapsed time from a beginning from a video program included in said video data.

23. An apparatus as claimed in claim 15, wherein said interaction means includes a plurality of input/output means, each input/output means for inputting a request or query for video data to be displayed on said input/output means.

24. An apparatus as claimed in claim 15, wherein said storage means includes storage for said video retrieval information data items.

25. An apparatus as claimed in claim 1, wherein said means for generating includes input controller means for receiving commands designating the video signals received by said receiving means.

26. An apparatus as claimed in claim 15, wherein said control means includes a search means for comparing terms in the request or query with terms in one or more of said related text portions of said video retrieval information data items.

27. An apparatus as claimed in claim 15, wherein said control means includes a search means for comparing an interpretation of terms in the request or query with an interpretation of terms in one or more of said related text portions of said video retrieval information data items.

28. An apparatus as claimed in claim 15, further including a compression means for receiving video signals from said receiving means and outputting compressed video data to said storage means.

29. An apparatus as claimed in claim 15, wherein said apparatus further includes decompression means for decompressing video data received from said storage means and outputting the decompressed video data to said interaction means.

30. An apparatus as claimed in claim 15, wherein said detectable change in content of said video signals includes one of: a change in speaker, a scene change, and a keyword vocabulary change.

* * * * *